United States Patent
Gordon et al.

(10) Patent No.: US 10,862,681 B2
(45) Date of Patent: Dec. 8, 2020

(54) OPTIMIZED SIGN OUT FOR SINGLE ACCOUNT SERVICES

(71) Applicant: Microsoft Technology Licensing, LLC, Redmond, WA (US)

(72) Inventors: Ariel Gordon, Kirkland, WA (US); John H. Forrest, Allen, TX (US); Jason Walter, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 15/479,197

(22) Filed: Apr. 4, 2017

(65) Prior Publication Data

US 2018/0287794 A1 Oct. 4, 2018

(51) Int. Cl.
| | | |
|---|---|---|
| *G06F 7/04* | (2006.01) | |
| *G06F 15/16* | (2006.01) | |
| *H04L 29/06* | (2006.01) | |
| *H04L 9/08* | (2006.01) | |
| *G06F 21/41* | (2013.01) | |
| *G06F 21/33* | (2013.01) | |
| *G06F 21/31* | (2013.01) | |

(52) U.S. Cl.
CPC ............ *H04L 9/0891* (2013.01); *G06F 21/31* (2013.01); *G06F 21/316* (2013.01); *G06F 21/335* (2013.01); *G06F 21/41* (2013.01); *H04L 63/0807* (2013.01); *H04L 63/0815* (2013.01); *H04L 63/0892* (2013.01); *H04L 63/102* (2013.01)

(58) Field of Classification Search
CPC ... H04L 9/0891; H04L 63/0815; G06F 21/41; G06F 21/335
USPC ............................................................ 726/8
See application file for complete search history.

(56) References Cited

U.S. PATENT DOCUMENTS

| | | | | |
|---|---|---|---|---|
| 2008/0134295 A1* | 6/2008 | Bailey | .................... | G06F 21/41 726/4 |
| 2009/0007250 A1* | 1/2009 | Pouzin | .................. | G06F 21/335 726/10 |

(Continued)

OTHER PUBLICATIONS

"International Search Report and Written Opinion Issued in PCT Application No. PCT/US2018/024696", dated May 29, 2018, 11 Pages.

*Primary Examiner* — Wasika Nipa
*Assistant Examiner* — Samuel Ambaye
(74) *Attorney, Agent, or Firm* — Mannava & Kang, P.C.

(57) ABSTRACT

An identity provider IP service provides an optimized sign out experience for a user accessing a single account service. The IP service designates a first account of a service as signed in based on first credentials provided by a user. The IP service provides a first security token for the first account to the service. Upon receiving a first sign out notification, the IP service determines whether the user wants to switch to a second account of the service. Upon determining that the user wants to switch to the second account, the IP service designates the second account as signed in based on second credentials provided by the user, provides a second security token for the second account to the service, and designates the first account as soft signed out so that the user can switch to the first account without re-providing the first credentials.

19 Claims, 13 Drawing Sheets

(56) References Cited

U.S. PATENT DOCUMENTS

| | | | |
|---|---|---|---|
| 2010/0179916 A1* | 7/2010 | Johns | G06Q 30/02 |
| | | | 705/319 |
| 2014/0173693 A1* | 6/2014 | Bikkula | H04L 63/0815 |
| | | | 726/4 |
| 2014/0358828 A1* | 12/2014 | Phillipps | G06N 20/00 |
| | | | 706/12 |
| 2016/0366126 A1* | 12/2016 | Sharifi | H04L 63/083 |
| 2017/0048236 A1 | 2/2017 | Kang et al. | |

* cited by examiner

130

Current Account: B

131  ☑ switch to A
132  ☐ sign out all 133
enter

Current Account: B

141  ☑ sign out B/switch to A
142  ☐ sign out all 143
enter

*FIG. 1D*

OPTIMIZED SIGN OUT FOR SINGLE ACCOUNT SERVICES

BACKGROUND

Many applications, or more generally services, maintain accounts for users. For each account, a service typically maintains a separate set of information. For example, an electronic mail service stores emails sent and received using each account. When creating an account for a user, the user provides credentials such as user name and password. The user name typically uniquely identifies the account, and the password is used to authenticate the user when the user later signs in to the account.

Many services employ an identity provider service to perform the authentication of users. When an account is created, the service directs the user to the identity provider service to input the user name and password for the account. The identity provider service maintains a database of user credentials for the service. When the user subsequently wants to access the account, the service directs the user to the identity provider service. The user provides the credentials to the identity provider service. The identity provider service verifies the credentials against those in the database. If the credentials are verified, the identity provider service provides to the service a security token for the account (e.g., indirectly via the device of the user). The security token is signed by the identity provider service and is evidence that the user has been authenticated as providing the proper credentials for the account. The service can check the signature of the security token to determine that it was signed by the identity provider service and check the content of the security token to confirm that the user has been authenticated. The service then allows the user to access the account.

Many services allow a client (e.g., browser or device) to be signed in to only one account at a time. For example, a user currently signed in to a first account of an email service using a certain browser may not be able to sign in to a second account of that email service using that browser without first signing out of the first account. If the user wanted to be signed in to both accounts simultaneously, the user might need to access the email service using a different browser or a different device. Such services are referred to as "single account services" because they allow only one account to be signed in to at a time from each client. Although it may be possible to modify each single account service to support sign in by multiple accounts from a single client, such modification would very time-consuming and might be prohibitively expensive. Moreover, many single account services may be considered to be legacy systems that are no longer supported by their developers and thus cannot practically be modified.

Unfortunately, requiring a user to sign out of one account before signing in to another account or to use multiple clients to be signed in to both accounts simultaneously presents a less than desirable user experience. As a result, users may be forced to interact with a single account service in a somewhat inefficient manner or seek out a different service that is similar but provides a multiple account service, if one is available.

SUMMARY

In some embodiments, an optimized sign out identity provider ("OSO-IP") service is provided to provide an optimized sign out experience for a user accessing a single account service. The OSO-IP service designates a first account of a service as signed in based on first credentials provided by a user. The OSO-IP service provides a first security token for the first account to the service. Upon receiving a first sign out notification, the OSO-IP service determines whether the user wants to switch to a second account of the service. Upon determining that the user wants to switch to the second account, the OSO-IP service designates the second account as signed in based on second credentials provided by the user. The OSO-IP service provides a second security token for the second account to the service. The OSO-IP service also designates the first account as soft signed out so that the user can switch to the first account without re-providing the first credentials.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A-1D are user interface elements that illustrate the requesting of user intent when signing out of an account in some embodiments.

DETAILED DESCRIPTION

Figure 1A:
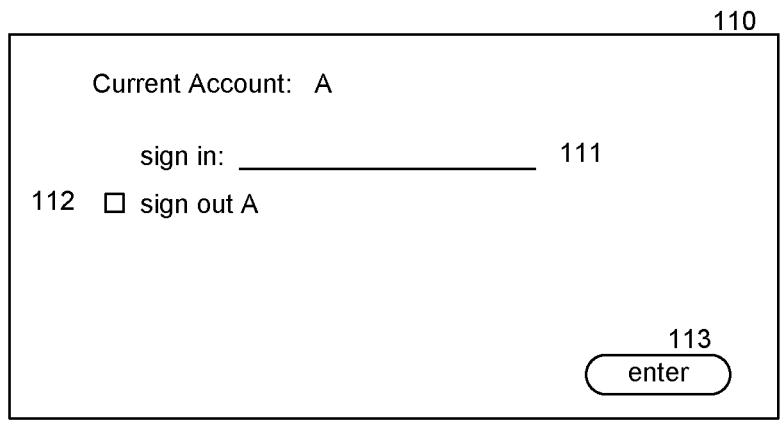
Figure 1B:
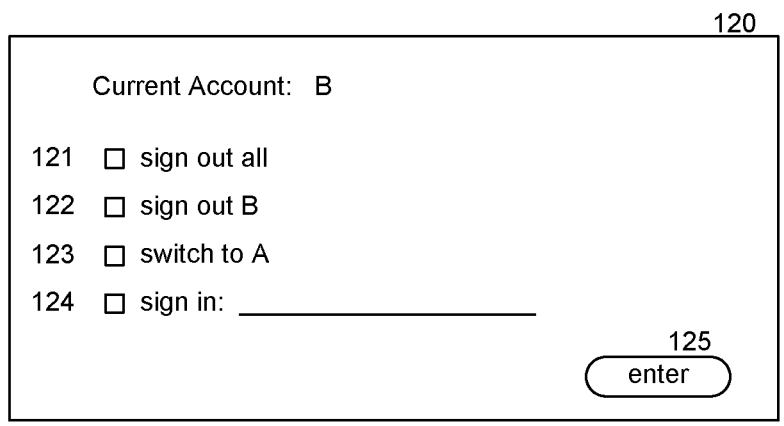

A method and system for optimizing the sign out experience of a user using a single account service is provided. In some embodiments, an optimized sign out ("OSO") system allows a user, who has signed in to a first account of a single account ("SA") service and then signed out of the SA service to sign in to a second account of the single account service, to sign back in to the first account without having to provide first credentials for the first account. The OSO system may be implemented as an identity provider ("OSO-IP") service that provides authentication services for SA services. When a user using a client requests to sign in to a first account of an SA service, the SA service directs the user to the OSO-IP service. The user provides first credentials (e.g., user name and password) for the first account to the OSO-IP service. The OSO-IP service verifies that the first credentials are valid for the SA service and sends a first security token to the SA service. The OSO-IP service also designates the first account as having been signed in. Upon receiving the first security token, the SA service verifies the first security token and completes the sign-in to the first account of the SA service. The user can then interact with the SA service using the first account.

Eventually, the user may want to sign in to a second account with the SA service using the same client. For example, the user may have multiple email accounts with an email service or may have both a low-privilege staff account and a high-privilege administrator account with an application of an organization. To sign in to the second account of the SA service, the user needs to sign out of the first account. When the user requests to sign out of the first account, the SA service signs the user out of the first account and then sends a sign out notification to the OSO-IP service so that the OSO-IP service will know that the user has signed out of the first account in order to remove state information relating to the sign-in to the first account. The OSO-IP service makes a determination as to whether to perform the typical sign out processing for the first account or to "interrupt" the sign out process to determine the user's intent by requesting the user to indicate whether the user wants to sign in to a second account. The request may also allow the user to provide second credentials for the second account and to indicate whether the user may want to sign back in to the first account. For example, if the client is a browser, the request may be presented to the user in a pop-up window with a checkbox for the user to indicate that the user may want to sign back in to the first account and a data entry area for entry of the second credentials for the second account.

When the OSO-IP service receives the response to the request, if the response indicates that the user does not want to sign in to another account, then the OSO-IP service performs the conventional processing for signing out of the first account. If, however, the response indicates that the user wants to sign in to a second account, the OSO-IP service verifies the second credentials provided in the response for the second account and sends a second security token to the SA service. The OSO-IP service also designates the second account as being signed in. Upon receiving the second security token, the SA service verifies the second security token and completes the sign-in to the second account of the SA service. The user can then interact with the SA service using the second account. In addition, if the response indicates that the user may want to sign back in to the first account, the OSO-IP service designates the first account as being "soft" signed out and does not perform its normal processing for a sign-out, that is, removing state information for the first account. Rather, the OSO-IP service maintains the state information (e.g., the first security token). If, however, the response indicates that the user does not want to sign back in to the first account, the OSO-IP service designates the first account as being signed out and performs its normal processing for a sign-out. The term "soft sign out" indicates the user has signed out of the first account with the SA service but that the OSO-IP service has saved state information so that the user can be signed back in to the first account without the user re-providing the first credentials. The term "sign out" indicates the user has signed out of the first account with the SA service and cannot be signed back in without re-providing the first credentials.

When the user indicates to sign out of the second account, the OSO-IP service receives the sign out notification as part of the SA service signing the user out of the second account. If the OSO-IP service determines that the client is soft signed in to the first account, the OSO-IP service may request the user to indicate whether the user wants to sign back in to the first account, referred to as "switching" accounts. If the user indicates to switch accounts, the OSO-IP service retrieves the first security token and sends it to the SA service, which signs the user back in to the first account. The OSO-IP service designates the first account as being signed in and the second account as being either soft signed out or signed out based on a determination as to whether the user might want to sign back in to the second account. In this way, the OSO-IP service provides an environment in which it appears to a user that they are signed in to multiple accounts of an SA service via a single client.

FIGS. 1A-1D are user interface elements that illustrate the requesting of user intent when signing out of an account in some embodiments. User interface element 110 is an example of the OSO-IP service requesting a user to indicate their intent when signing out of account A. If the user wants to sign in to another account, the user enters the credentials for the other account in sign in area 111. If the user wants to sign out of account A, the user selects checkbox 112. The user selects the enter button 113 send their intent. User interface element 110 allows the user to sign out of account A and not sign in to any other account, sign out of account A and sign in to another account, or to stay what appears to be signed in to account A and to sign in to another account.

User interface element 120 is an example of the OSO-IP service requesting a user to indicate their intent when assigning out of account B. In this example, the user is signed in to account B and is soft signed out of account A. The user has the option of signing out of both account A and account B using checkbox 121, signing out of account B using checkbox 122, switching to be signed in to account A using checkbox 123, or signing in to a new account using the sign in area 124. The user selects various combinations of the checkboxes to express their intent. The user selects the enter button 125 to transmit their intent.

User interface element 130 is an example of the OSO-IP service requesting a user to indicate their intent in some embodiments. User interface element 130 is a simplified version of user interface element 120 in that the user is given only the option to express their intent to switch to account A or to sign out of both account A and account B. The OSO-IP service may use machine learning to infer a user's likely intent. For example, if a user normally switches between accounts when accessing a certain SA service, the OSO-IP service may elicit the user's intent using user interface element 130, which is simpler than user interface element 120. Checkbox 131 may be a checked by default to indicate the likely user intent. Checkbox 132 may be deemphasized as it is unlikely to be the user intent, but is needed when the user ultimately wants to sign out of the accounts. The user simply selects the enter button 133 to transmit their intent to switch to account A. User interface element 130 does not, however, allow the user to sign in to another account. To sign in to another account, the user would need to select checkbox 132 (e.g., automatically de-selecting checkbox 131) to sign out of account A and account B and then access the sign in page for the SA service to sign in to the other account.

User interface element 140 is an example of the OSO-IP service requesting a user to indicate their intent in some embodiments. User interface element 140 allows the user to sign out of account B and switch to account A using checkbox 141 or to sign out of both accounts using checkbox 142. The user selects the enter button 143 to transmit their intent. User interface element 140 may be useful when, for example, the user has a low-privilege account A and a high-privilege account B with an application of an organization. The organization may want to require all high-privilege accounts to be automatically signed out for security reasons. For example, if a device is shared by multiple employees, such as in a retail store, the automatic signing out of high-privilege accounts may be desirable, for example, when multiple employees share the same low-privilege account.

Figure 2:
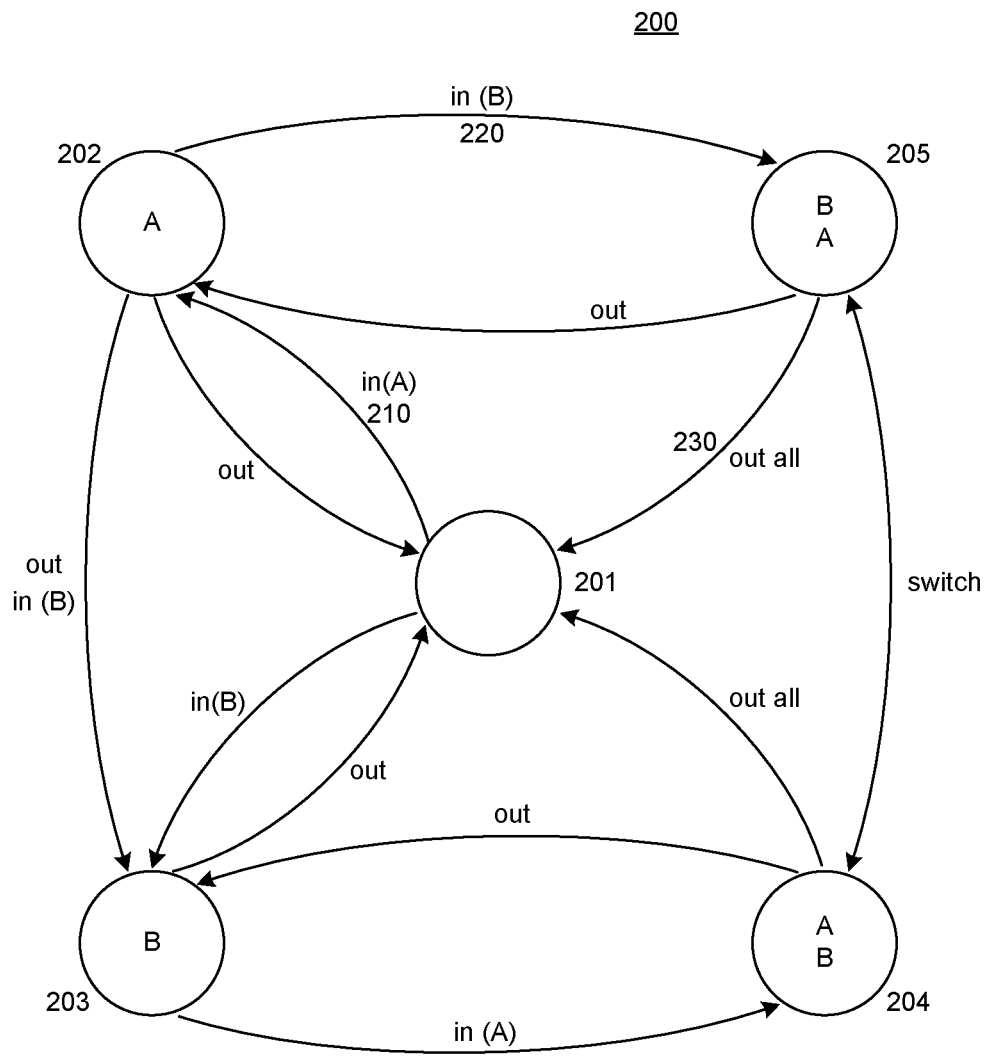
FIG. 2 is a state diagram that illustrates the states of accounts of the OSO-IP service in some embodiments.

FIG. 2 is a state diagram that illustrates the states of accounts of the OSO-IP service in some embodiments. A state diagram 200 includes states 201-205. State 201 indicates that no accounts are signed in. State 202 indicates that only account A is signed in. State 203 indicates that only account B is signed in. State 204 indicates that account A is signed in and that account B is soft signed out. State 205 indicates that account B is signed in and that account A is soft signed out. The lines between the states indicate events causing transition from one state to another state. For example, if the current state is 201 and the user signs in to account A, then line 210 indicates the transition to state 202. As another example, if the current state is 202 and the user signs in to account B, then line 220 indicates the transition from state 202 to state 205. As another example, if the current state is 205 and the user indicates to sign out from all accounts, then line 230 indicates the transition from state 205 to state 201.

Figure 3:
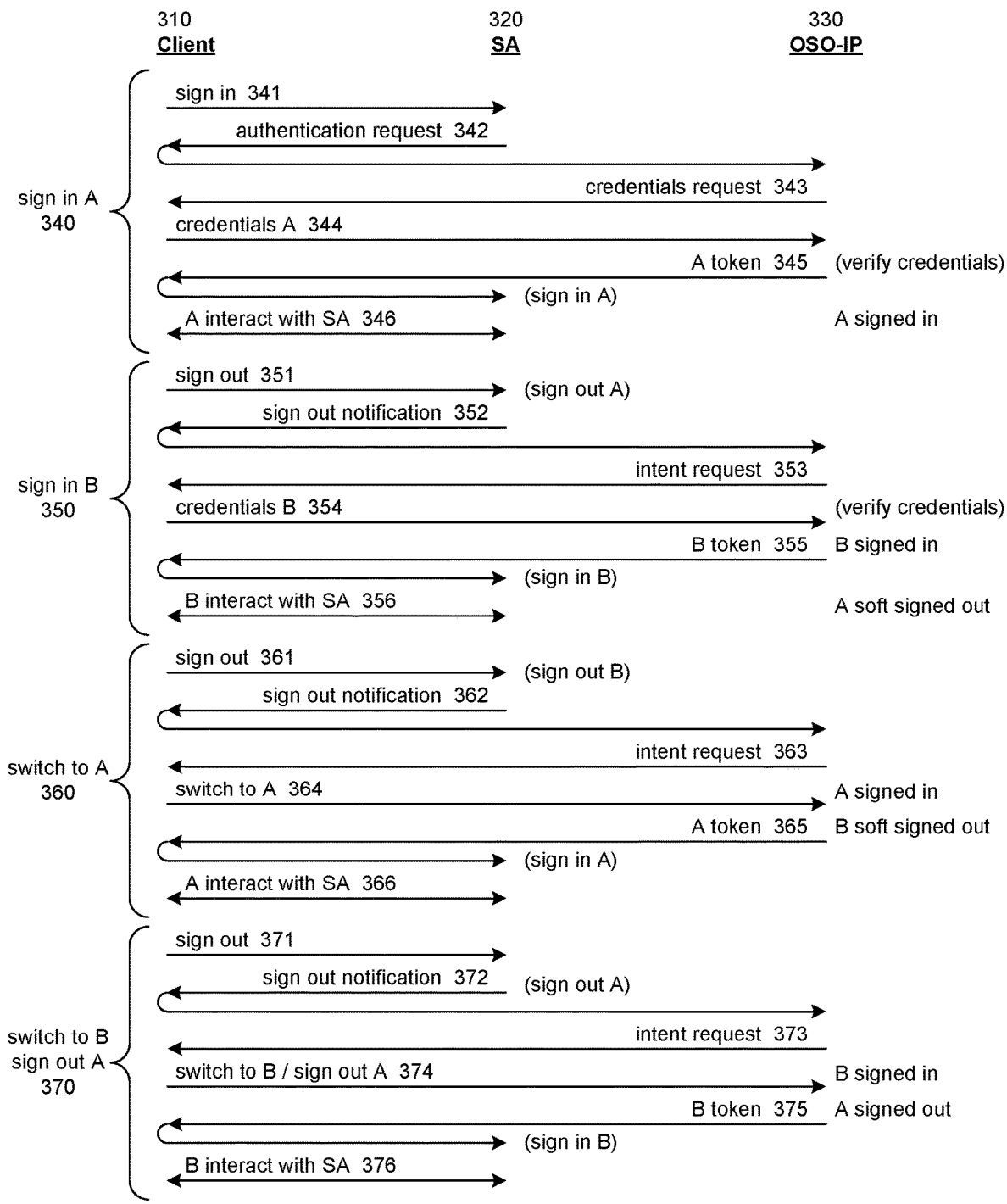
FIG. 3 is a communications flow diagram that illustrates communications between a client, an SA service, and an OSO-IP service in some embodiments.

FIG. 3 is a communications flow diagram that illustrates communications between a client, an SA service, and an OSO-IP service in some embodiments. Communications 340 indicate client 310 signing in to account A of SA service 320 that uses OSO-IP service 330 as an identity provider service. When a user wants to sign in to the SA service, the client sends 341 a sign in request to the SA service. Since the SA service uses the OSO-IP service, it sends 342 an authentication request via the client to the OSO-IP service. The OSO-IP service sends 343 a request for credentials to the client (e.g., a sign in web page). The client sends 344 the credentials to the OSO-IP service. The OSO-IP service verifies the credentials for account A and sends 345 a security token for account A to the SA service via the client. The SA service completes the signing in. The user can then interact 346 with the SA service using account A.

Communications 350 indicate the client signing in to account B with a soft sign-out for account A. Initially, the client sends 351 a sign out request to the SA service. The SA service designates account A as signed out and sends 352 a sign out notification to the OSO-IP service via the client. The OSO-IP service sends 353 an intent request to the client. The client sends 354 the credentials for account B along with an indication to stay signed in to account A. The OSO-IP service verifies the credentials and indicates that account B is signed in and that account A is soft signed out. The OSO-IP service then sends 355 a security token for account B to the SA service via the client. The SA service completes the sign-in for account B. The client can then interact 356 with the SA service using account B.

Communications 360 indicate the switching from being signed in to account B to being signed in to account A. The client sends 361 a sign out request to the SA service. The SA service designates account B as signed out and sends 362 a sign out notification to the OSO-IP service. The OSO-IP service sends 363 an intent request to the client. The client sends 364 an indication that the intent is to switch to account A. The OSO-IP service designates account A as now signed in and account B as being soft signed out and sends 365 the security token for account A to the SA service via the client. The SA service signs the user in to account A using the security token. The client can then interact 366 with the SA service.

Communications 370 indicate the switching to account B along with signing out from account A. The client sends 371 a sign out request to the SA service. The SA service designates account A as signed out and sends 372 a sign out notification to the OSO-IP service via the client. The OSO-IP service sends 373 an intent request to the client. The client sends 374 an indication that the intent is to switch to account B and to sign out of account A. The OSO-IP service designates account B as signed in and account A as signed out and sends 375 the security token for account B to the SA service via the client. The SA service signs the user in to account B based on the security token. The client then interacts 376 with the SA service using account B.

Figure 4:
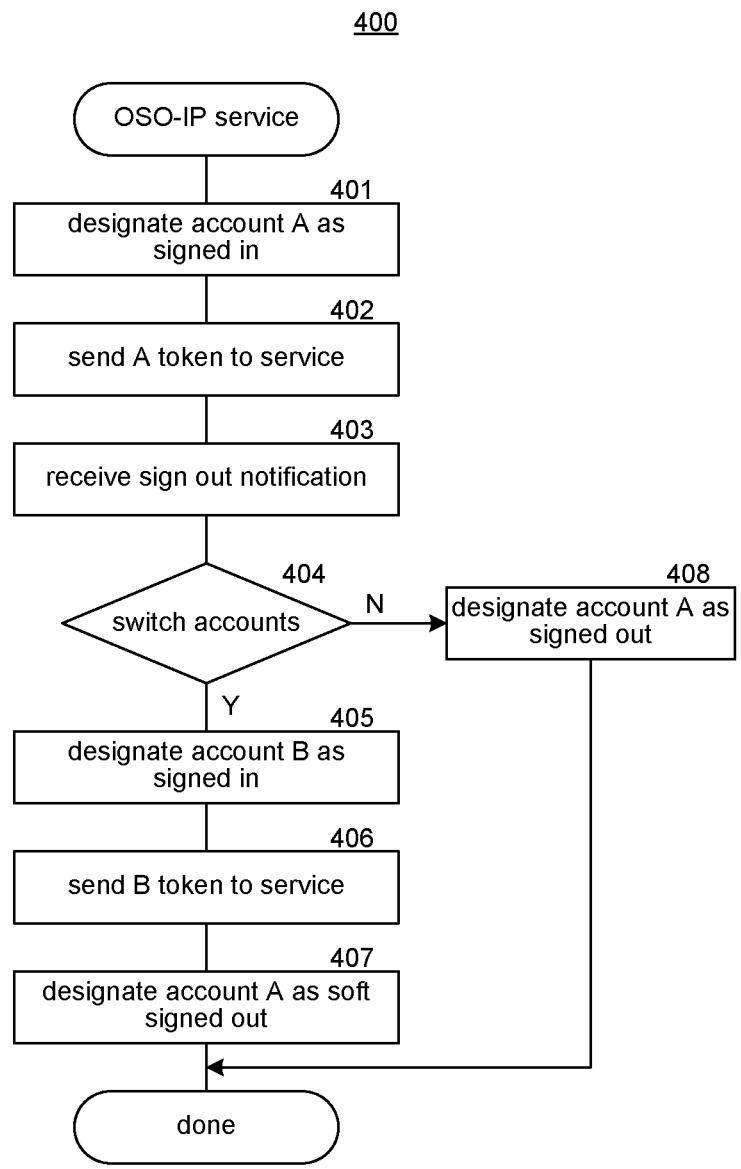
FIG. 4 is a flow diagram that illustrates high-level processing of a component of the OSO-IP service in some embodiments.

FIG. 4 is a flow diagram that illustrates high-level processing of a component of the OSO-IP service in some embodiments. A component 400 illustrates the signing in to account A and then signing in to account B and designating account A as soft signed out. In block 401, the component designates account A as signed in based on credentials received from the client for account A. In block 402, the component sends a security token for account A to the SA service. In block 403, the component receives a sign out notification from the SA service indicating that the user has requested to sign out of account A. In decision block 404, if the intent of the user is to switch accounts, then the component continues at block 405, else the component continues at block 408. In block 405, the component designates account B as signed in based on verification of the credentials. In block 406, the component sends a security token for account B to the service. In block 407, the component designates account A as being soft signed out and completes. In block 408, the component designates account A as signed out and completes.

Figure 5:
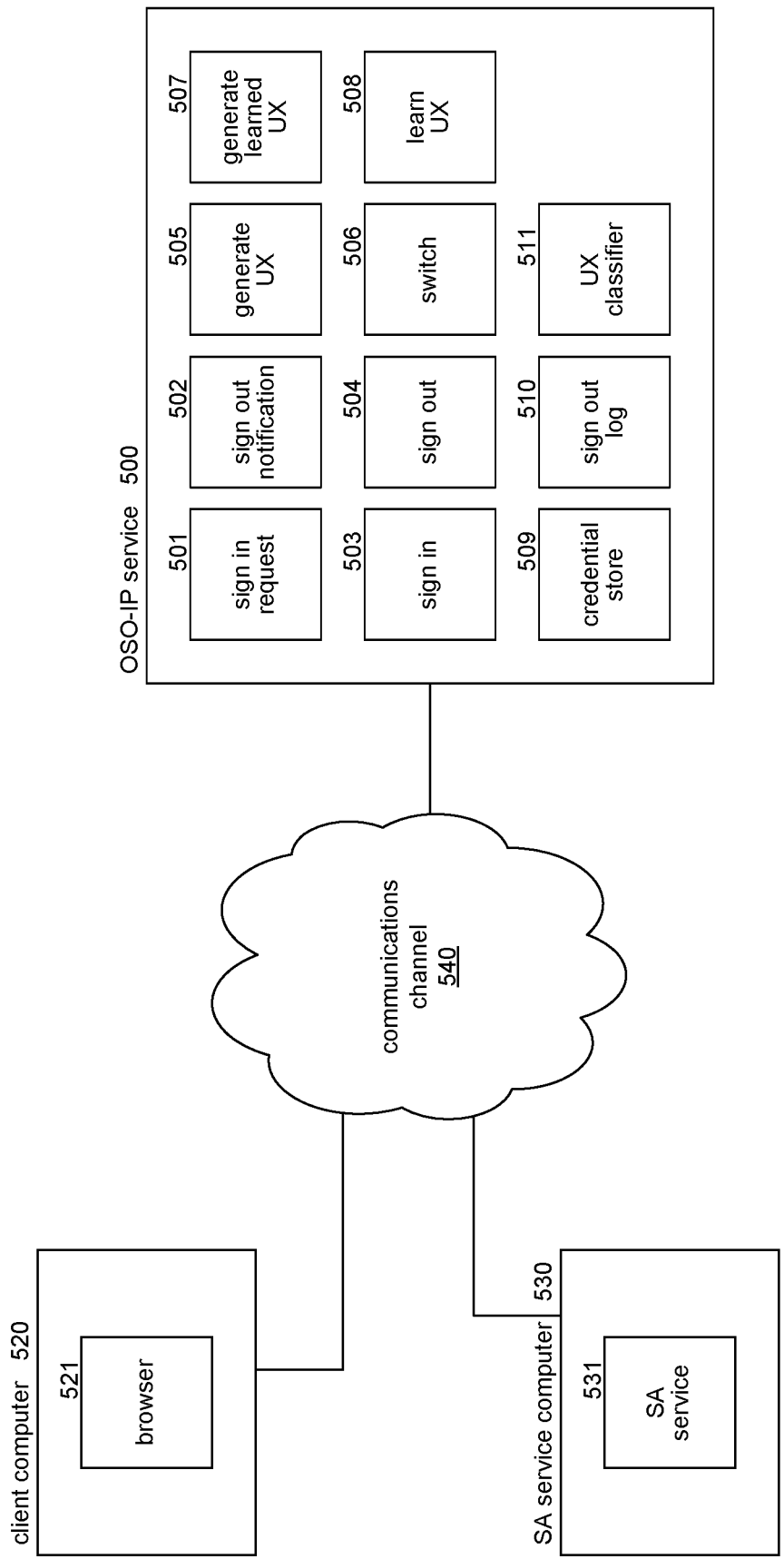
FIG. 5 is a block diagram that illustrates components of the OSO-IP service in some embodiments.

FIG. 5 is a block diagram that illustrates components of the OSO-IP service in some embodiments. OSO-IP service 500, client computer 520, and SA service computer 530 are connected to communications channel 540. The OSO-IP service includes a sign in request component 501, a sign out notification component 502, a sign in component 503, a sign out component 504, a generate user experience component 505, a switch component 506, a generate learned user experience component 507, and a learn user experience component 508. The OSO-IP service also includes a credential store 509, a sign out log 510, and a user experience classifier 511. The sign in request component processes a sign in request from the SA service by invoking the sign in component. The sign out notification component processes a sign out notification received from the SA service by invoking the sign out component. The sign out component may invoke the generate user experience component to generate the user interface element to present to the user that has requested to sign out. The sign out component may also invoke the switch component to effect the switching from one account to another account. The generate learned user experience component is invoked to generate a user experience using a user experience classifier. The user experience classifier is trained using the learn user experience component based on data collected when users express their intent and stored in the sign out log. The credential store stores the credentials for the accounts of the SA service. The client computer includes a browser 521, which is the client that the user uses to interact with the SA service. The SA service computer includes the SA service 531.

The computing systems, also referred to as computer systems, used by the OSO-IP service may include a central processing unit, input devices, output devices (e.g., display devices and speakers), storage devices (e.g., memory and disk drives), network interfaces, graphics processing units, accelerometers, cellular radio link interfaces, global positioning system devices, and so on. A computing system may include multiple devices such as servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OSO-IP service. The data transmission media are used for transmitting data via transitory, propagating signals or carrier waves (e.g., electromagnetism) via a wired or wireless connection.

The OSO-IP service may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the OSO-IP service may be implemented in hardware using, for example, an application-specific integrated circuit (ASIC).

Figure 6:
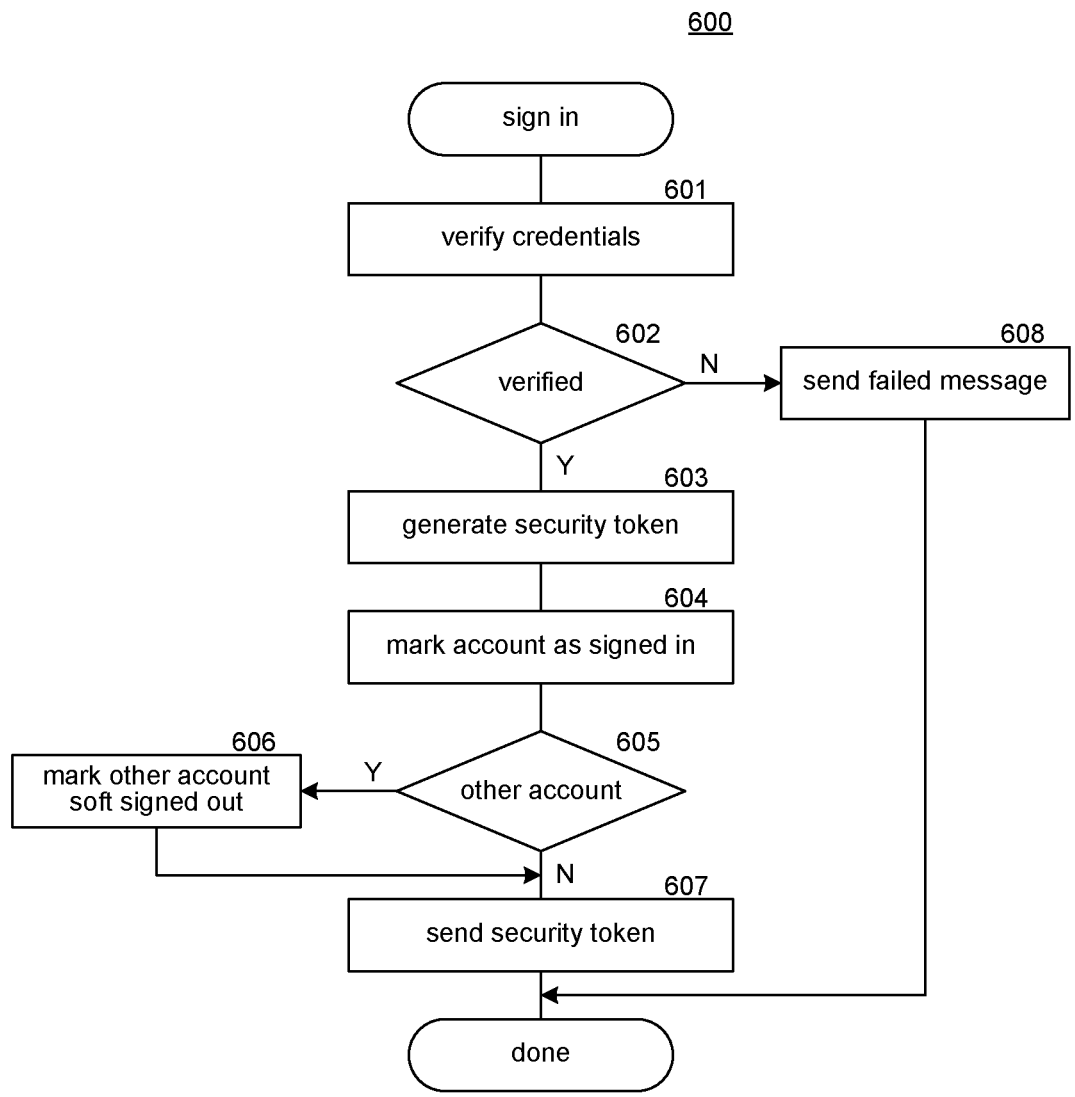
FIG. 6 is a flow diagram that illustrates processing of a sign in component of the OSO-IP service in some embodiments.

FIG. 6 is a flow diagram that illustrates processing of a sign in component of the OSO-IP service in some embodiments. A sign in component 600 is invoked to process a request to sign in to an account based on provided credentials. In block 601, the component verifies the credentials based on the credential store. In decision block 602, if the credentials have been verified, then the component continues at block 603, else the component continues at block 608. In block 603, the component generates a security token for the account. In block 604, the component designates the account as being signed in. In decision block 605, if another account was signed in, then the component continues at block 606, else the component continues at block 607. In block 606, the component designates the other account as soft signed out and continues at block 607. In block 607, the component sends the security token to the SA service and completes. In block 608, the component sends a failed message to the client and completes.

Figure 7:
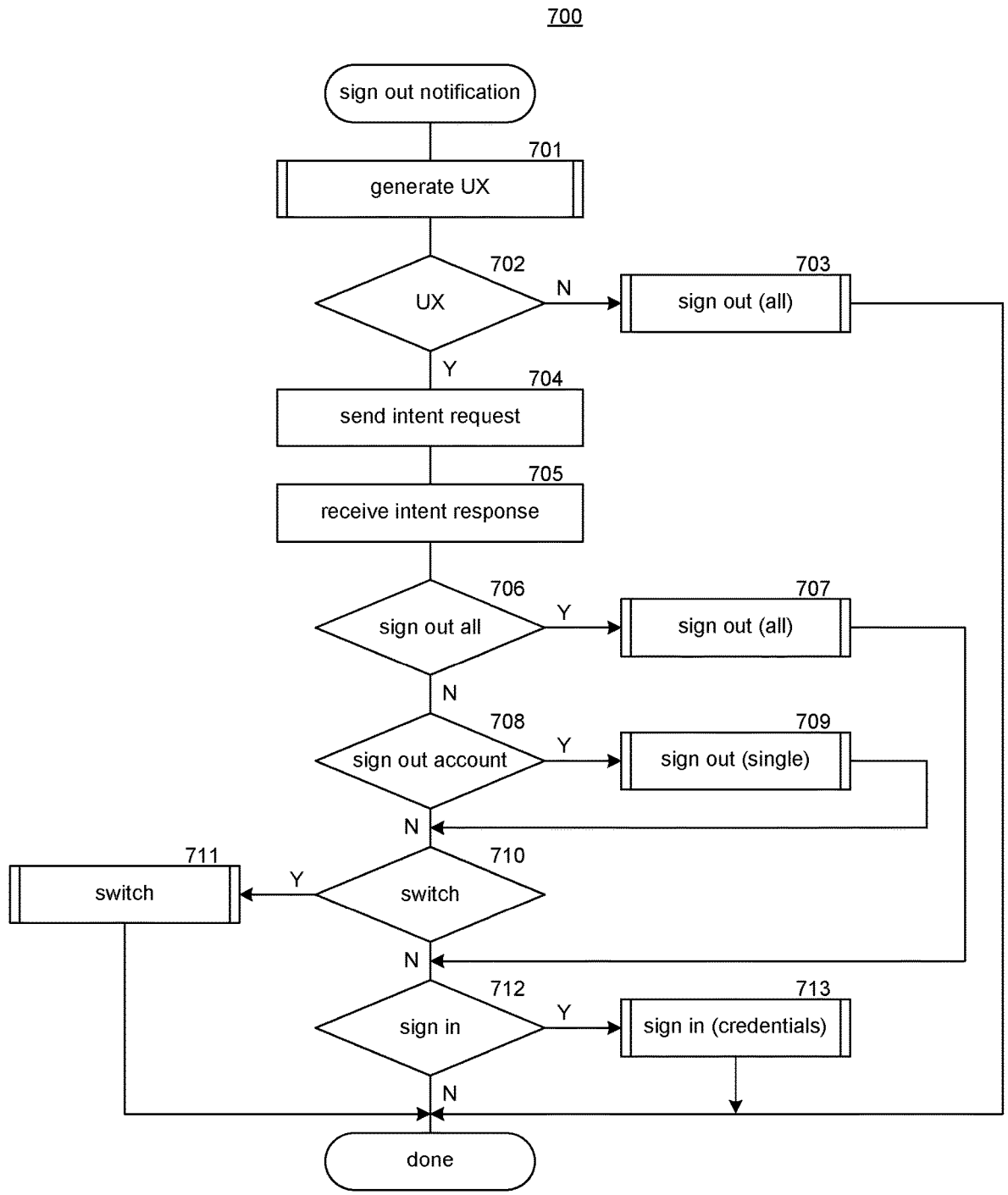
FIG. 7 is a flow diagram that illustrates processing of a sign out notification component of the OSO-IP service in some embodiments.

FIG. 7 is a flow diagram that illustrates processing of a sign out notification component of the OSO-IP service in some embodiments. A sign out notification component 700 is invoked when the OSO-IP service receives a sign out notification from an SA service. In block 701, the component invokes a generate user experience component to generate a user interface element to present to the user. In decision block 702, if a user interface element was generated, then the component continues at block 704, else the component continues at block 703. A user interface element may not be generated, for example, if a company has designated that certain accounts should always be signed out. In block 703, the component invokes a sign out component passing an indication that all accounts are to be signed out and then completes. In block 704, the component sends an intent request to the user that includes the generated user interface element. In block 705, the component receives the intent response from the client. In decision block 706, if the intent is to sign out of all accounts, then the component continues at block 707, else the component continues at block 708. In block 707, the component invokes the sign out component passing an indication to sign out of all accounts and then continues at block 712. In decision block 708, if the intent is to sign out of a single account, then the component continues at block 709, else the component continues at block 710. In block 709, the component invokes the sign out component indicating to sign out of a single account and then continues at block 710. In decision block 710, if the intent is to switch accounts, then the component continues at block 711, else the component continues at block 712. In block 711, the component invokes a switch component to switch accounts and then completes. In block 712, if the intent is to sign in to an account, then the component continues at block 713, else the component completes. In block 713, the component invokes the sign in component passing an indication of the credentials and then completes.

Figure 8:
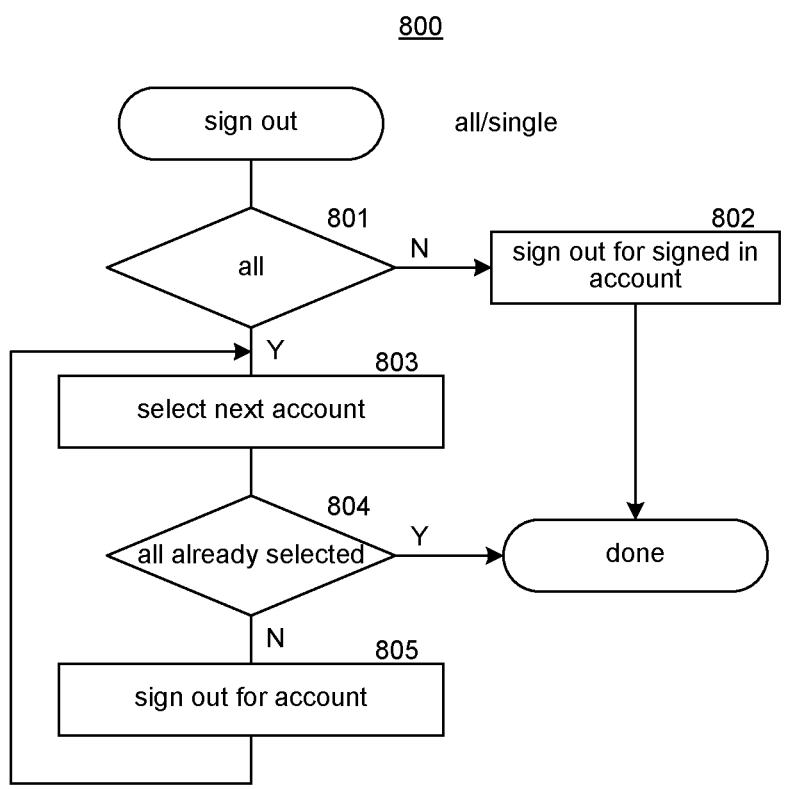
FIG. 8 is a flow diagram that illustrates processing of the sign out component of the OSO-IP service in some embodiments.

FIG. 8 is a flow diagram that illustrates processing of the sign out component of the OSO-IP service in some embodiments. A sign out component 800 is invoked to sign out of a single account or all accounts as specified by a parameter. In decision block 801, if all accounts are to be signed out, then the component continues at block 803, else the component continues at block 802. In block 802, the component designates the account that is currently designated as signed in as signed out and removes any state information and then completes. In block 803, the component selects the next account. In decision block 804, if all the accounts have already been selected, then the component completes, else the component continues at block 805. In block 805, the component designates the selected account as signed out and removes any state information for the account and then loops to block 803 to select the next account.

Figure 9:
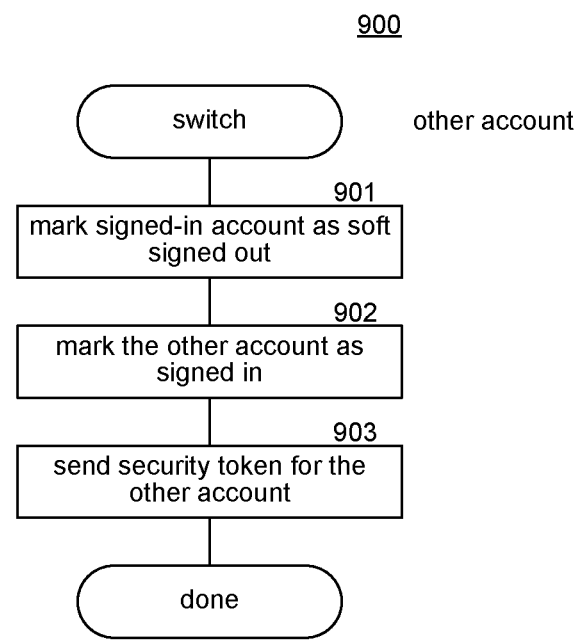
FIG. 9 is a flow diagram that illustrates processing of a switch component of the OSO-IP service in some embodiments.

FIG. 9 is a flow diagram that illustrates processing of a switch component of the OSO-IP service in some embodiments. A switch component 900 is invoked to switch to another account. In block 901, the component designates the signed in account, if any, as being soft signed out. In block 902, the component designates the other account as signed in. In block 903, the component sends a security token for the other account to the SA service and then completes.

Figure 10:
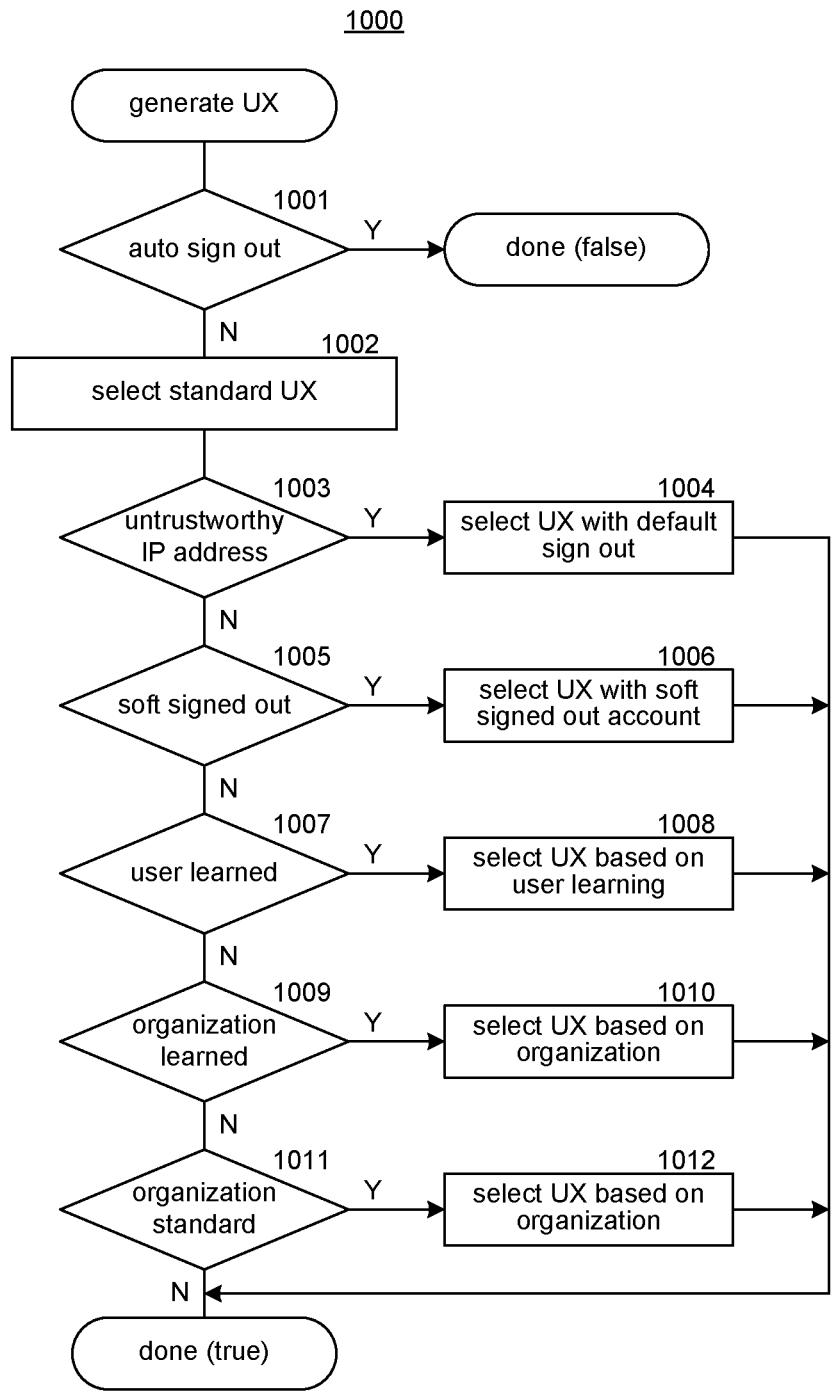
FIG. 10 is a flow diagram that illustrates processing of a generate user experience component of the OSO-IP system in some embodiments.

FIG. 10 is a flow diagram that illustrates processing of a generate user experience component of the OSO-IP system in some embodiments. A generate user experience component 1000 is invoked to generate a user interface element for eliciting a user's intent. In decision block 1001, if the SA service has designated an automatic sign out for all sign out requests, then the component completes returning an indication that a user interface element was not created, else the component continues at block 1002. In block 1002, the component selects a standard user interface element. In decision block 1003, if the IP address of the client is untrustworthy, then the component continues at block 1004, else the component continues at block 1005. In block 1004, the component selects a user interface element with a default set to sign out of the currently signed in account and then completes. An IP address may be considered untrustworthy, for example, if the client computer may be used by the public such as in a library. In decision block 1005, if there is an account designated as being soft signed out, then the component continues at block 1006, else the component continues at block 1007. In block 1006, the component selects a user interface element with an option to switch to the soft signed out account and then completes. In decision block 1007, if the user interface element has been learned for the user (e.g., using a trained classifier), then the component continues at block 1008, else the component continues at block 1009. In block 1008, the component selects the user interface element learned for the user and then completes. In decision block 1009, if a user interface element has been learned for the organization, then the component continues at block 1010, else the component continues at block 1011. In block 1010, the component selects the user interface element learned for the organization and then completes. In decision block 1011, if the organization has a standard user interface element, then the component continues at block 1012, else the component completes. In block 1012, the component selects the user experience for the organization and then completes.

Figure 11:
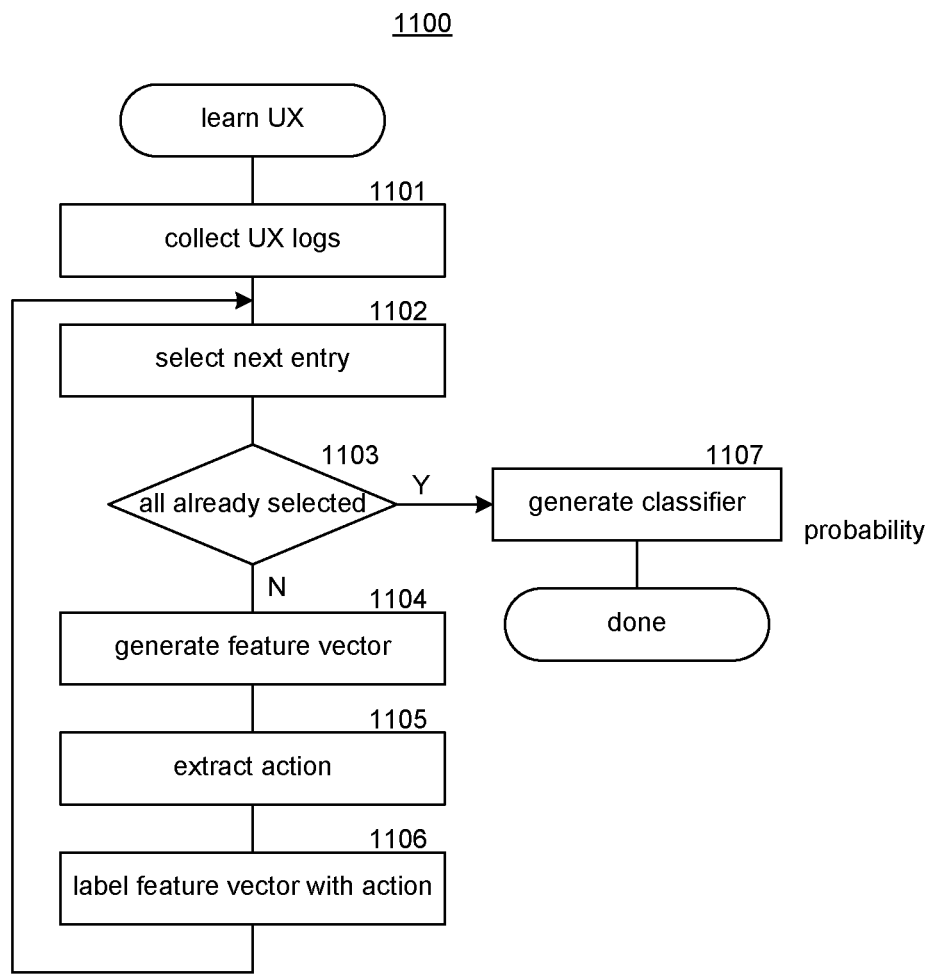
FIG. 11 is a flow diagram that illustrates processing of a learn user experience component of the OSO-IP service in some embodiments.

FIG. 11 is a flow diagram that illustrates processing of a learn user experience component of the OSO-IP service in some embodiments. A learn user experience component 1100 is invoked to train a classifier to select a user interface element that is appropriate. In block 1101, the component collects logs of actions taken by users in responding to requests for their intent. For example, for each intent that is expressed, the log may contain an entry that indicates the action selected by the user, the user, the SA service, the organization, and so on. In blocks 1102-1106, the component loops generating training data to use in training the classifier. In block 1102, the component selects the next entry of the log. In decision block 1103, if all the entries have already been selected, then the component continues at block 1107, else the component continues at block 1104. In block 1104, the component generates a feature vector for the selected entry. The feature vector may include information such as the identity of the service, the user name of the credentials, demographic information about the user, the organization, privilege level of the account, IP address of the client, client device type, and so on. In block 1105, the component extracts the action from the action that the user took. In block 1106, the component labels a feature vector with the action and then loops to block 1102 to select the next entry. In block 1107, the component trains a classifier using the training data. The classifier may be probability-based in that, when provided with a feature vector, it provides a probability for each of the likely actions.

Figure 12:
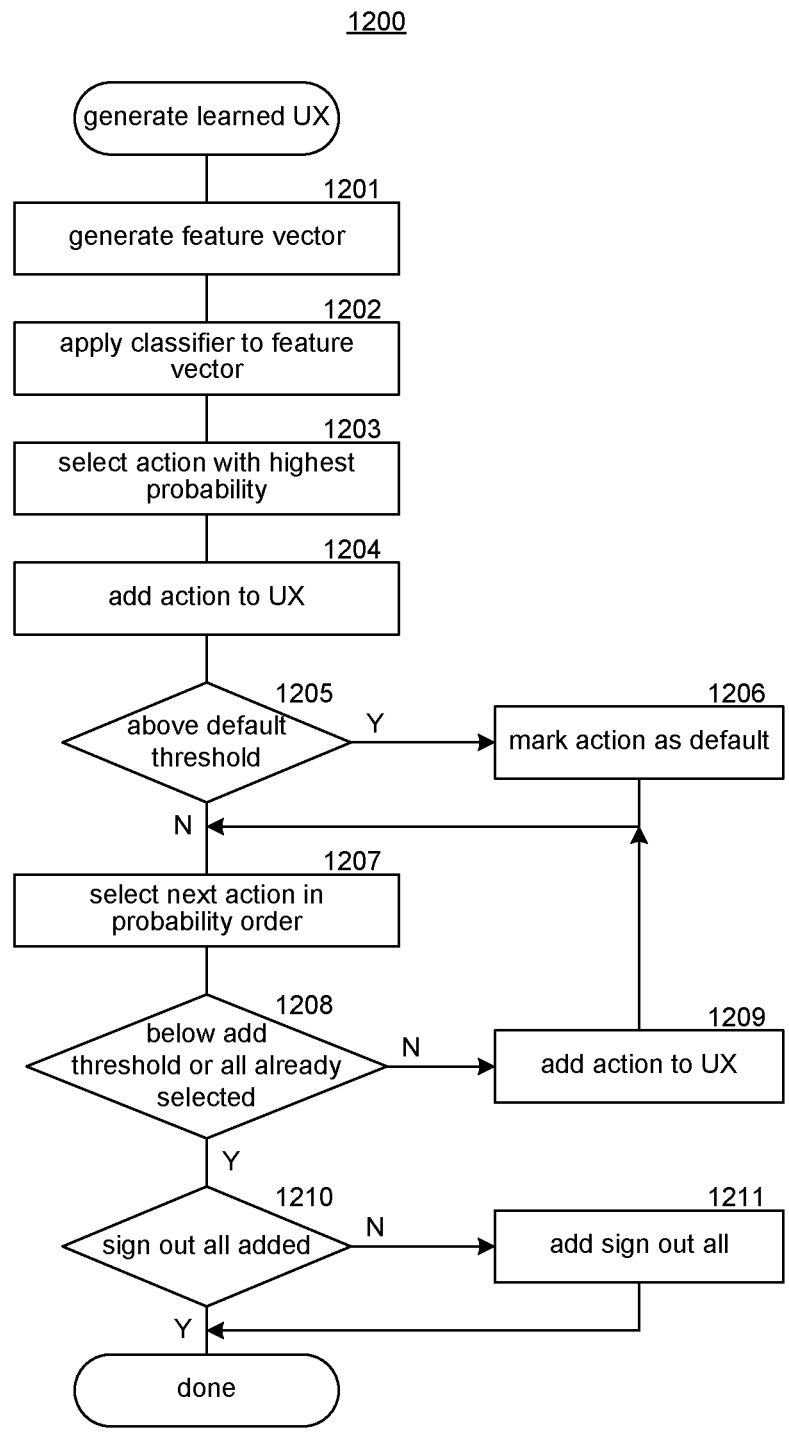
FIG. 12 is a flow diagram that illustrates processing of a generate learned user experience component of the OSO-IP service in some embodiments.

FIG. 12 is a flow diagram that illustrates processing of a generate learned user experience component of the OSO-IP service in some embodiments. A generate learned user experience component 1200 is invoked to generate a user experience using a trained classifier. In block 1201, the component generates a feature vector based on the current request to sign out of an account. In block 1202, the component applies a classifier to the feature vector. In block 1203, the component selects the action with the highest probability. In block 1204, the component adds that action to the user interface element. In decision block 1205, if the action is above a threshold probability for marking the action as a default action, then the component continues at block 1206, else the component continues at block 1207. In block 1206, the component marks the action to be the default action, for example, by checking a checkbox, and then continues at block 1207. In blocks 1207-1209, the component loops adding additional actions to the user interface element. In block 1207, the component selects the next action in probability order. In decision block 1208, if the probability of the selected action is below the threshold for adding to the user interface element or all the user interface elements have already been selected, then the component continues at block 1210, else the component continues at block 1209. In block 1209, the component adds the selected action to the user interface element and loops to block 1207 to select the next action. In decision block 1210, if a sign out all action is to be added to the user interface element, then the component continues at block 1211, else the component completes. In block 1211, the component adds a sign out all action to the user interface element and then completes.

In some embodiments, the OSO-IP service may use various machine learning techniques to generate a classifier, such as a support vector machine, a Bayesian network, a Naïve Bayesian network, learning regression, and a neural network, when training a classifier. A single classifier may be trained for use with all services, a classifier may be trained for each service, or a classifier may be trained for each user. The OSO-IP service may use a decision tree for classification. A decision tree classifier is used to classify data by applying rules of the tree to the data until a leaf node is reached. The data is then assigned the classification of the leaf node. A decision tree classifier is typically represented by rules that divide data into a series of binary hierarchical groupings or nodes. Each node has an associated rule that divides the data into two child groups or child nodes. A decision tree is constructed by recursively partitioning training data. At each node in the decision tree, the prediction system selects a partition that tends to maximize some metric. A metric that is commonly used is based on information gain. Decision tree classifiers and appropriate metrics are described in Quinlan, J. R., "Programs for Machine Learning," Morgan Kaufmann Publishers, 1993, which is hereby incorporated by reference.

The following paragraphs describe various embodiments of aspects of the OSO-IP service. An implementation of the OSO-IP service may employ any combination of elements of the various embodiments. The processing described below may be performed by a computing device with a processor that executes computer-executable instructions stored on a computer-readable storage medium that implements the OSO-IP service.

In some embodiments, a method performed by a computing system of an identity provider service is provided. The receives a first sign out notification that a user has requested to sign out of a first account associated with a service. A first security token is associated with the first account and generated when the user provided first credentials for the first account. The first account is designated as signed in. In response to receiving the first sign out notification, the method requests the user to indicate whether the user wants to sign in to a second account associated with the service. When the user wants to sign in to the second account, the method receives receiving from the user second credentials for the second account, generates a second security token for the second account, and after verifying the second credentials, sends the second security token to the service so that the service can sign the user in to the second account. The method designates the first account as soft signed out and the second account as signed in. In some embodiments, the method further receives a second sign out notification that the user has requested to sign out of the second account.

After receiving the second sign out notification, the method sends the first security token to the service so that the service can sign the user back in to the first account without the user re-providing the first credentials. The method designates the first account as signed in and the second account as soft signed out. In some embodiments, the method further a second sign out notification that the user has requested to sign out of the second account. After receiving the second sign out notification, the method requests the user to indicate whether the user wants to switch to the first account W the user indicates to switch to the first account, sends the first security token to the service so that the service can sign the user back in to the first account without the user re-providing the first credentials and designates the first account as signed in and the second account as soft signed out. In some embodiments, the requesting after receiving the second sign out notification further includes requesting the user to indicate whether to sign out of the second account and when the user indicates to sign out of the second account, the method further designates second account as signed out. In some embodiments, the method further receives a second sign out notification that the user has requested to sign out of the second account. After receiving the second sign out notification, the method requests the user to indicate whether the user wants to sign out of the first account and the second account. When the user indicates to sign out of the first account and the second account, the method sets the state of the first account and the second account to signed out so that the user will need to re-provide the first credentials to sign in to the first account and re-provide the second credentials to sign in to the second account. In some embodiments, the requesting further includes requesting the user to indicate whether the user wants to sign out of the first account and, when the user indicates to sign out of the first account, designating the first account as signed out; and when the user does not indicate to sign out of the first account, designating the first account as soft signed out. In some embodiments, the method further receives a second sign out notification that the user has requested to sign out of the second account. After receiving the second sign out notification, when the second account has been designated as requiring sign out, the method designates the first account as signed in and the second account as signed out to require the user to re-provide the second credentials when signing in to the second account and sends the first security token to the service so that the service can sign the user back in to the first account without the user re-providing the first credentials. In some embodiments, the method receives a second sign out notification that the user has requested to sign out of the second account. After receiving the second sign out notification, the method requests the user to select one of a plurality of actions with respect to the first account or the second account. In some embodiments, one of the plurality of actions is to sign in to the first account and stay signed in to the second account. In some embodiments, one of the plurality of actions is to sign in to the first account and sign out of the second account. In some embodiments, one of the plurality of actions is to sign out of the first account and the second account. In some embodiments, one of the plurality of actions is to sign in to a third account. In some embodiments, one of the plurality of actions is designated as a default action. In some embodiments, the plurality of actions are selected based on a machine learning algorithm applied to a log of actions selected by one or more users and features associated with each selection.

In some embodiments, a computing system for providing identity services is provided. The computing system comprises one or more computer-readable storage media storing computer-executable instructions and one or more processors for executing the computer-executable instructions stored in the one or more computer-readable storage media. The instructions, when executed, control the computing system to designate a first account of a service as signed in based on first credentials provided by a user and provide a first security token for the first account to the service, The instructions further control the computing system to, upon receiving a first sign out notification, determine whether the user wants to switch to a second account with the service The instructions further control the computing system to, upon determining that the user wants to switch to the second account, designate the second account as signed in based on second credentials provided by the user, provide a second security token for the second account to the service, and designate the first account as soft signed out so that the user can switch to the first account without re-providing the first credentials. In some embodiments, the computer-executable instructions, when executed, further control the computing system to, upon receiving a second sign out notification, upon determining that the user wants to switch to the first account, designate the first account as signed in, provide the first security token to the service, and designate the second account as being signed out or soft signed out based on determining whether to require the user to re-provide the second credentials when signing in to the second account.

In some embodiments, a method performed by a computing system is provided. The method designates designating a first account of a service as signed in based on first credentials provided by a user. The method provides a first security token for the first account to the service. Upon receiving a first sign out notification, the method determines whether the user wants to switch to a second account of the service. Upon determining that the user wants to switch to the second account, the method designates the second account as signed in based on second credentials provided by the user, provides a second security token for the second account to the service, and designates the first account as soft signed out so that the user can switch to the first account without re-providing the first credentials. In some embodiments, the service does not support being signed in to multiple accounts simultaneously from a single device.

In some embodiments, a method performed by a computing system is provided. The method accesses a log of entries collected when an identity provider service provides to a user currently signed in to a service with a first account an intent request. Each entry specifies an action taken when signing out of an account and specifies the user and the service. The method generates training data for a classifier that includes feature vectors with labels. The generating includes, for each entry, extracting features associated with the user and the service specified by the entry to form a feature vector and labeling the feature vector with the action specified by the entry. The method trains a classifier using the training data to classify likely intended actions based on features associated with a user and a service. In some embodiments, the trained classifier is adapted to be used by an identity service provider to determine a likely intended action of a user who has signed out of one account of a service and signed in to another account of the service upon receiving a notification that the user has signed out of the other account of the service.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system, the method comprising:
   receiving a first sign out notification that a user has requested to sign out of a first account associated with a service, wherein a first security token is associated with the first account and generated when the user provided first credentials for the first account, the first account being designated as signed in;
   in response to receiving the first sign out notification, causing a window to be displayed that includes a first request requesting the user to indicate whether the user wants to sign in to a second account associated with the service and a second request requesting the user to indicate whether the user wants to sign back in to the first account at a later time;
   based on a receipt of an indication that the user wants to sign in to the second account and an indication that the user wants to sign back in to the first account at a later time, signing the user in to the second account based on second credentials for the second account received from the user, the second credentials differing from the first credentials, while soft signing out the user from the first account, wherein the soft sign out of the first account enables the user to sign back into the first account without providing the first credentials again; and
   designating the first account as soft signed out and the second account as signed in.

2. The method of claim 1, further comprising:
   receiving a second sign out notification that the user has requested to sign out of the second account; and
   based on receipt of the second sign out notification,
      sending the first security token to the service, wherein, based on receipt of the first security token, the service is to sign the user back in to the first account without the user re-providing the first credentials; and
      designating the first account as signed in and the second account as soft signed out, wherein the soft sign out of the second account enables the user to sign back into the second account without providing the second credentials again.

3. The method of claim 1, further comprising:
   receiving a second sign out notification that the user has requested to sign out of the second account; and
   based on the receipt of the second sign out notification of the second account, causing a window to be displayed that includes a third request requesting the user to indicate whether the user wants to switch to the first account and a fourth request requesting the user to indicate whether the user wants to sign back in to the second account at a later time; and
   based on a receipt of an indication that the user wants to switch to the first account and an indication that the user wants to sign back in to the second account at a later time,
      sending the first security token to the service, wherein, based on receipt of the first security token, the service is to sign the user back in to the first account without the user re-providing the first credentials; and
      designating the first account as signed in and the second account as soft signed out, wherein the soft sign out of the second account enables the user to sign back into the second account without providing the second credentials again.

4. The method of claim 3, further comprising:
   based on a receipt of an indication that the user does not want to sign back in to the second account at a later time, designating the second account as signed out.

5. The method of claim 1, further comprising:
   receiving a second sign out notification that the user has requested to sign out of the second account; and
   based on receipt of the second sign out notification,
      requesting the user to indicate whether the user wants to sign out of the first account and the second account; and
      based on a receipt of an indication that the user wants to sign out of the first account and the second account, setting a state of the first account and a state of the second account to signed out, wherein after being signed out, the user is to re-provide the first credentials to sign in to the first account and re-provide the second credentials to sign in to the second account.

6. The method of claim 1, wherein the second request requesting whether the user wants to sign back in to the first account at a later time includes a check box requesting the user to indicate whether the user wants to sign out of the first account and, the method further comprising:
   based on a determination that a check mark is present at the check box to indicate that the user wants to sign out of the first account, designating the first account as signed out; and
   based on a determination that a check mark is not present at the check box to indicate that the user does not want to sign out of the first account, designating the first account as soft signed out.

7. The method of claim 1, further comprising:
   receiving a second sign out notification that the user has requested to sign out of the second account; and
   based on receipt of the second sign out notification,
      based on the second account being designated as requiring sign out, designating the first account as signed in and the second account as signed out to require the user to re-provide the second credentials when signing in to the second account; and
      sending the first security token to the service, wherein, based on receipt of the first security token, the service is to sign the user back in to the first account without the user re-providing the first credentials.

8. The method of claim 1, further comprising:
   receiving a second sign out notification that the user has requested to sign out of the second account; and
   based on receipt of the second sign out notification, requesting the user to select one of a plurality of actions with respect to the first account or the second account.

9. The method of claim 8, wherein one of the plurality of actions includes at least one of:
   signing in to the first account and staying signed in to the second account; or
   signing in to the first account and signing out of the second account.

10. The method of claim 8, wherein one of the plurality of actions is to sign out of the first account and the second account.

11. The method of claim 8, wherein one of the plurality of actions is to sign in to a third account.

12. The method of claim 8, wherein one of the plurality of actions is designated as a default action.

13. The method of claim 8, wherein the plurality of actions are selected based on a machine learning algorithm applied to a log of actions selected by one or more users and features associated with each selection.

14. A computing system comprising:
one or more computer-readable storage media storing computer-executable instructions that, when executed, control the computing system to:
designate a first account of a service as signed in based on first credentials provided by a user;
provide a first security token for the first account to the service;
based on a receipt of a first sign out notification of the first account, cause a window to be displayed that includes a first request to determine whether the user wants to switch to a second account with the service and a second request to determine whether the user wants to sign back in to the first account at a later time;
based on a determination that the user wants to switch to the second account and wants to sign back in to the first account at a later time,
designate the second account as signed in based on second credentials provided by the user, the second credentials differing from the first credentials;
provide a second security token for the second account to the service; and
designate the first account as soft signed out, wherein the soft sign out of the first account enables the user to sign back into the first account without re-providing the first credentials; and
one or more processors for executing the computer-executable instructions stored in the one or more computer-readable storage media.

15. The computing system of claim 14, wherein the computer-executable instructions, when executed, control the computing system to:
based on a receipt of a second sign out notification of the second account, cause a window to be displayed that includes a third request requesting the user to indicate whether the user wants to switch to the first account and a fourth request requesting the user to indicate whether the user wants to sign back in to the second account at a later time;
based on a receipt of an indication that the user wants to switch to the first account and an indication that the user wants to sign back in to the second account at a later time,
designate the first account as signed in;
provide the first security token to the service; and
designate the second account as being soft signed out, wherein the soft sign out of the second account enables the user to sign back into the second account without re-providing the second credentials.

16. A method performed by a computing system, the method comprising:
designating a first account of a service as signed in based on first credentials provided by a user;
providing a first security token for the first account to the service;
based on receipt of a first sign out notification of the first account, causing a window to be displayed that includes a first request requesting the user to indicate whether the user wants to switch to a second account of the service and a second request requesting the user to indicate whether the user wants to sign back into the first account at a later time; and
based on indications that the user wants to switch to the second account and wants to sign back in to the first account at a later time, signing the user in to the second account based on second credentials provided by the user, the second credentials differing from the first credentials, and designating the first account as soft signed out, wherein the soft sign out of the user from the first account enables the user to sign back into the first account without re-providing the first credentials.

17. The method of claim 16, wherein the service does not support being signed in to multiple accounts simultaneously from a single device.

18. A method performed by a computing system, the method comprising:
accessing a log of entries collected when an identity service provider provides to a user currently signed in to a first account of a service an intent request, each entry of the log of entries specifying an action taken when signing out of an account and specifying the user and the service, wherein the action taken includes:
causing, by the identity service provider, a display of a window that includes a first request requesting the user to indicate whether the user wants to sign in to a second account of the service and a second request requesting the user to indicate whether the user wants to soft sign out of the first account, wherein the soft sign out of the first account indicates the user wants to sign back into the first account at a later time without re-providing first credentials used to previously sign into the first account;
receiving, from the user, second credentials for the second account based on a receipt of an indication that the user wants to sign in to the second account, the second credentials differing from the first credentials; and
receiving, from the user, an intention to soft sign out of the first account and to sign into the second account;
generating training data for a classifier that includes feature vectors with labels, the generating including, for each entry of the log of entries, extracting features associated with the user and the service specified by the entry to form a feature vector and labeling the feature vector with the action specified by the entry; and
training a classifier using the training data to classify likely intended actions based on features associated with a user and a service.

19. The method of claim 18, wherein the trained classifier is to be used by the identity service provider to determine a likely intended action of a user who has signed out of one account of a service and signed in to another account of the service upon receiving a notification that the user has signed out of the other account of the service.

* * * * *